(12) United States Patent
Furukawa

(10) Patent No.: US 9,077,169 B2
(45) Date of Patent: Jul. 7, 2015

(54) CONNECTION STRUCTURE FOR SHIELD WIRE

(71) Applicant: Yazaki Corporation, Minato-ku, Tokyo (JP)

(72) Inventor: Shouichi Furukawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/202,267

(22) Filed: Mar. 10, 2014

(65) Prior Publication Data

US 2014/0182931 A1    Jul. 3, 2014

Related U.S. Application Data

(63) Continuation of application No. PCT/JP2012/069855, filed on Aug. 3, 2012.

(30) Foreign Application Priority Data

Sep. 14, 2011 (JP) ................. 2011-200420

(51) Int. Cl.
*H01R 13/20* (2006.01)
*H02G 15/16* (2006.01)
*H01R 9/05* (2006.01)
*H01R 4/18* (2006.01)
*H01R 13/6592* (2011.01)
*H02G 15/02* (2006.01)

(52) U.S. Cl.
CPC ............... *H02G 15/16* (2013.01); *H01R 4/185* (2013.01); *H01R 4/188* (2013.01); *H01R 9/0518* (2013.01); *H01R 13/6592* (2013.01); *H02G 15/025* (2013.01)

(58) Field of Classification Search
USPC ............ 174/74 R, 77 R, 78, 84 R, 84 C, 88 C
See application file for complete search history.

(56) References Cited

U.S. PATENT DOCUMENTS

| | | | | | |
|---|---|---|---|---|---|
| 3,992,773 | A | * | 11/1976 | Duffner et al. ................. | 29/862 |
| 4,152,538 | A | * | 5/1979 | Gassinger et al. .............. | 174/19 |
| 5,749,756 | A | * | 5/1998 | Vockroth et al. .............. | 439/879 |
| 6,339,193 | B1 | * | 1/2002 | Goett et al. ..................... | 174/78 |
| 7,575,485 | B2 | * | 8/2009 | Waltz et al. ................... | 439/783 |
| 2010/0221949 | A1 | | 9/2010 | Okamoto | |

FOREIGN PATENT DOCUMENTS

EP    2148400 A1    1/2010
JP    2008-198530 A    8/2008

(Continued)

OTHER PUBLICATIONS

International Search Report for PCT/JP2012/069855 dated Oct. 23, 2012.

(Continued)

*Primary Examiner* — William H Mayo, III
(74) *Attorney, Agent, or Firm* — Sughrue Mion, PLLC

(57) ABSTRACT

In a connection structure for a shield wire, a shield conductor of the shield wire is fastened tightly by a shield fastening portion for a connection thereto. The shield fastening portion is provided with a plurality of holes. A wire contact surface of the shield fastening portion has: at least an area around each of the holes and on the lower side of a wire pulling direction, as a non-knurled surface which is not knurled; and other area as a knurled surface which is knurled.

2 Claims, 6 Drawing Sheets

(56) References Cited

FOREIGN PATENT DOCUMENTS

| JP | 2008-287899 A | 11/2008 |
| JP | 2009-193879 A | 8/2009 |
| JP | 2010-49859 A | 3/2010 |
| JP | 2011-210592 A | 10/2011 |

OTHER PUBLICATIONS

Communication dated May 7, 2015 from the European Patent Office in counterpart European Application No. 12832666.7.

* cited by examiner

CONNECTION STRUCTURE FOR SHIELD WIRE

CROSS REFERENCE TO RELATED APPLICATION

This is a continuation application based on PCT application No. PCT/JP2012/069855 filed on Aug. 3, 2012, which claims the benefit of priority from Japanese Patent Application No. 2011-200420 filed on Sep. 14, 2011, the entire contents of which are incorporated by reference herein.

BACKGROUND OF THE INVENTION

1. Field of the Invention

The present invention relates to a connection structure for a shield wire, where a shield conductor of the shield wire is fastened tightly by a shield fastening portion for connection.

2. Description of the Related Art

Patent Literature 1 (Japanese Patent Application Laid-Open Publication No. 2010-49859) discloses a shield connector which employs a conventional connection structure for a shield wire. As shown in FIG. 1, a shield connector 50 includes an inner housing 51, a connection terminal 52 which the inner housing 51 accommodates, and a shield shell 60 which covers the outer circumference of the inner housing 51.

The inner housing 51 is formed of an insulator which has a predetermined permittivity. The connection terminal 52 includes a core wire fastening portion 53 and a contact portion 54 which is for a connection to a corresponding terminal. The shield shell 60 is formed of a conductive material. The shield shell 60 includes a shield body 61 which covers the inner housing 51, a shield fastening portion 62 which protrudes backward from the shield body 61, and a wire fastening portion 63. The shield fastening portion 62 is provided with a plurality of holes 64.

A coaxial shield wire W1 includes a core wire 70 which is a conductor, an insulating inner cover 71 which covers the outer circumference of the core wire 70, a braided wire 72 which is a shield conductor and covers the insulating inner cover 71, and an insulating outer cover 73 which covers the outer circumference of the braided wire 72. At a terminal part of the shield wire W1, the core wire 70 is exposed and then the braided wire 72 is exposed. The core wire 70 is fastened tightly by the core wire fastening portion 53 of the connection terminal 52 for a connection thereto. The braided wire 72 is fastened tightly by the shield fastening portion 62 of the shield shell 60 for a connection thereto. The shield wire W1 is fastened tightly from the top of the insulating outer cover 73 by the wire fastening portion 63 of the shield shell 60 and firmly fixed thereto.

As shown in FIG. 2A, in order to enhance the wire fastening force at the shield fastening portion 62, there is a need to fasten the braided wire 72 tightly with a strong fastening force. As shown in FIG. 2B, if the strong fastening force is applied on the shield fastening portion 62, the insulating inner cover 71 is extremely compressed so that the core wire 70 might snap. There is therefore a limit of the fastening force to be applied on the shield fastening portion 62.

The exposed braided wire 72 is also easy to fray. There is therefore a need to prevent the fray of the braided wire 72.

Then, in order to achieve the enhancement of the wire fastening force at the shield fastening portion 62 and the prevention of the fray of the braided wire 72 without having the core wire 70 snap, the shield fastening portion 62 has the following structure.

That is, as shown in FIGS. 3 and 4, the shield fastening portion 62 is provided with a plurality of holes 64. The shield fastening portion 62 also has a conductor connection surface made as a knurled surface 65 by knurling.

As shown in FIG. 4, in the above-described structure, since the braided wire 72 receives the compression force by being fastened at the shield fastening portion 62, the braided wire 72 is pressed into each of the holes 64 of the shield fastening portion 62. The edge effect of each of the holes 64 enables to obtain the wire fastening force (wire pulling strength) which is at a predetermined level or more, even though the strong fastening force is not applied on the shield fastening portion 62. Also, a concave-convex surface by knurling prevents the fray of the braided wire 72.

However, in the above-described conventional example, as shown in FIG. 4, when a concave part 65a of the knurled surface 65 is positioned around each of the holes 64, the substantial amount of pressing the braided wire 72 into the hole 64 (engagement amount of the braided wire 72) decreases, and thereby the edge effect by the hole 64 diminishes. It is therefore not possible to surely prevent the fray of the braided wire 72 and also enhance the wire fastening force (wire pulling strength) at the shield fastening portion 62.

SUMMARY OF THE INVENTION

The present invention has an object to provide a connection structure for a shield wire, which surely prevents the fray of a shield conductor and also enhances the wire fastening force at a shield fastening portion.

According to an aspect of the present invention, there is provided a connection structure for a shield wire, including: a shield wire that has a shield conductor; and a shield fastening portion that tightly fastens the shield conductor of the shield wire such that the shield fastening portion is connected to the shield wire, wherein the shield fastening portion is provided with a hole, the shield fastening portion has a wire contact surface that includes: a non-knurled surface that is not knurled, the non-knurled surface being an area around the hole and on the lower side of a wire pulling direction; and a knurled surface that is knurled, the knurled surface being an area other than the area around the hole and on the lower side of the wire pulling direction.

It is preferable that around the hole, an area on the upper side of the wire pulling direction is knurled and an area on the lower side of the wire pulling direction is not knurled.

According to the present invention, since the shield conductor adheres closely to the knurled surface which is the concave-convex surface, the shield conductor does not fray. Since the shield conductor receives the compression force by being fastened, the shield conductor is pressed into the hole of the shield fastening portion. Since there is no concave part of the knurled surface positioned around the hole, the edge effect by the hole does not diminish. Therefore, even though a strong fastening force is not applied on the shield fastening portion, it is possible to obtain the wire fastening force (wire pulling strength) which is at a predetermined lever or more. As described above, it is possible to surely prevent the fray of the shield conductor and also enhance the wire fastening force at the shield fastening portion.

DESCRIPTION OF THE EMBODIMENTS

An exemplary embodiment of the present invention will be described with reference to the drawings.

Figure 1:
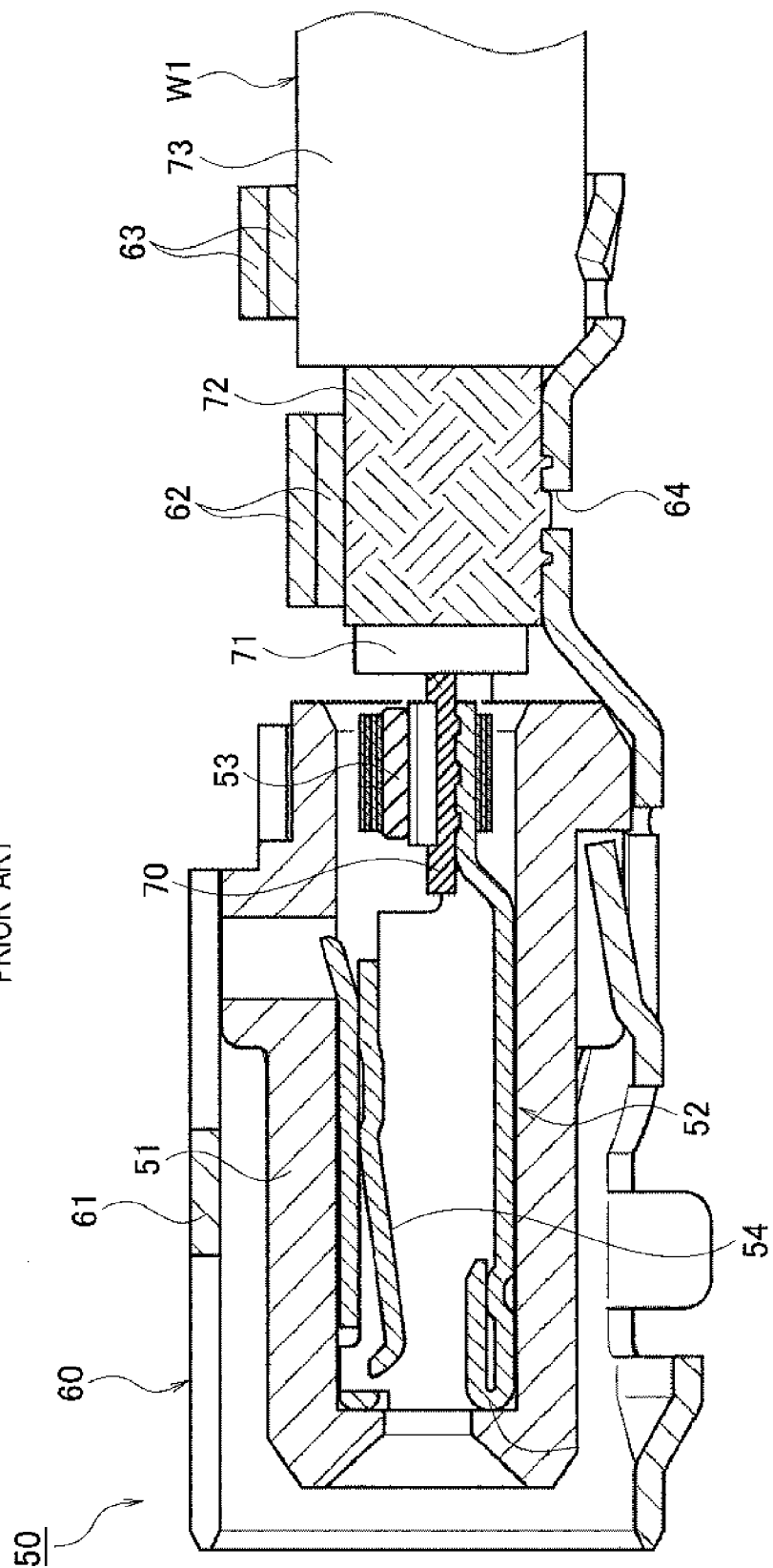
FIG. 1 is a cross-sectional view of a conventional shield connector.
Figure 2A:
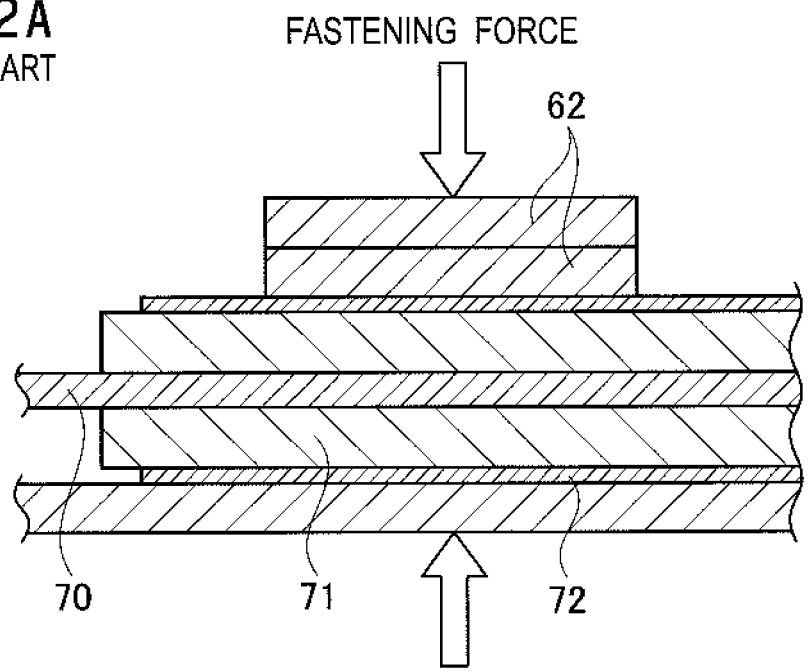
FIG. 2A is a cross-sectional view of a conventional shield fastening portion.
Figure 2B:
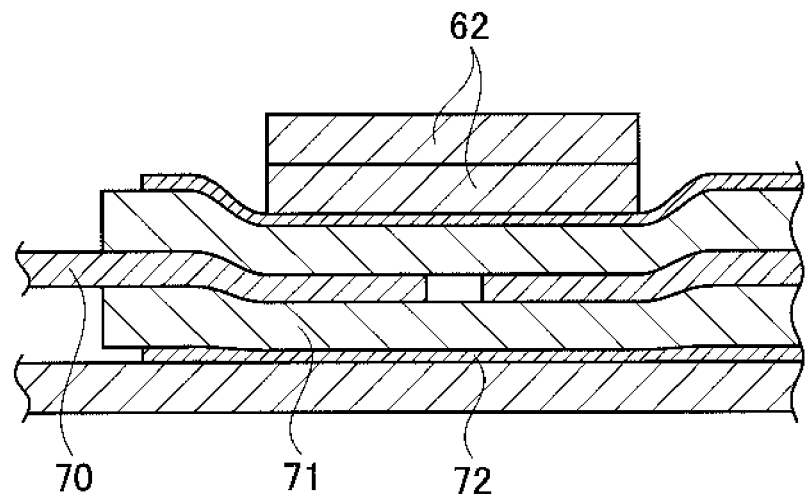
FIG. 2B is a cross-sectional view of a core wire which snapped within the conventional shield fastening portion.
Figure 3:
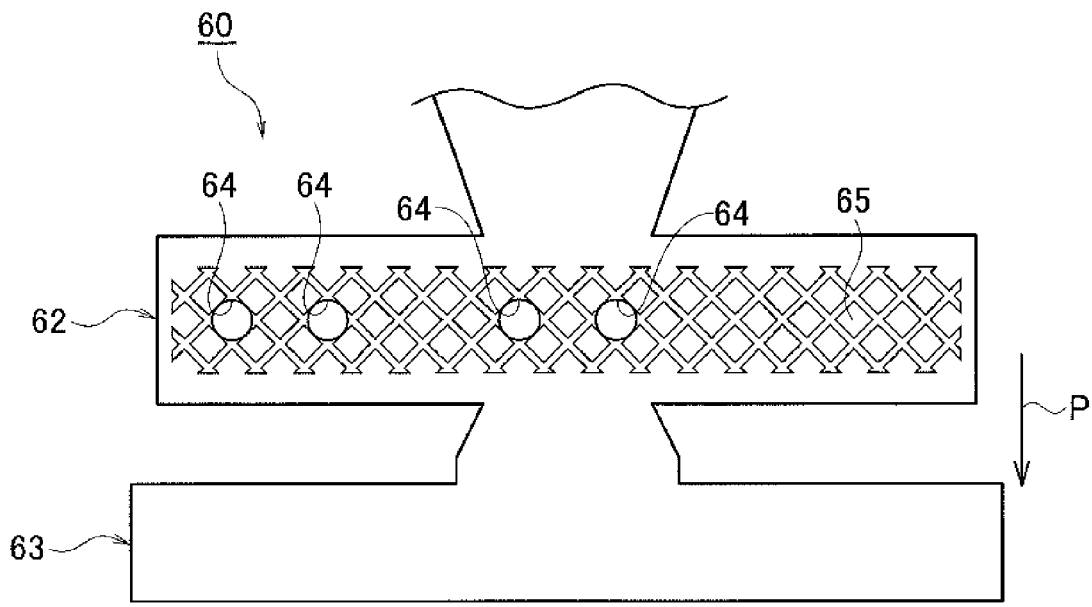
FIG. 3 is a development view of a different conventional shield fastening portion and a wire fastening portion.
Figure 4:
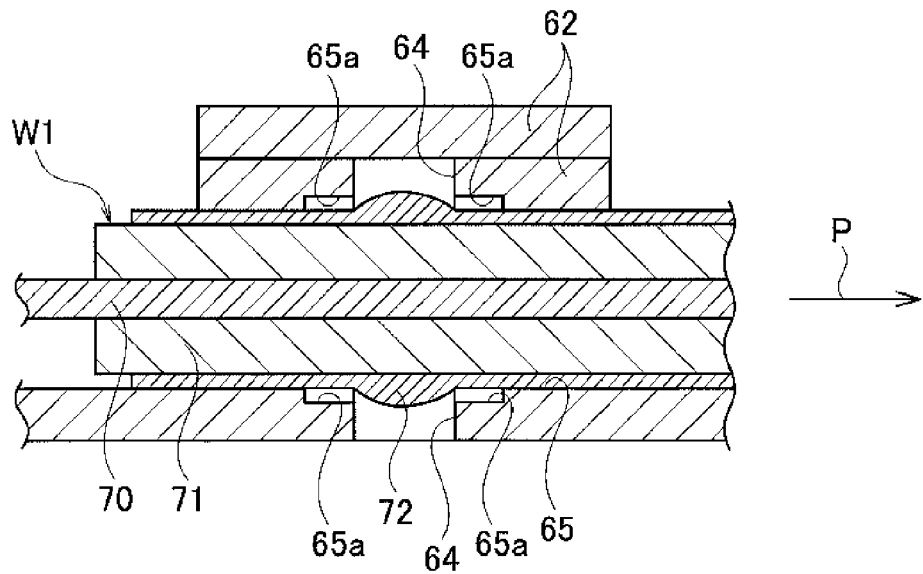
FIG. 4 is a cross-sectional view of the different conventional shield fastening portion.
Figure 5A:
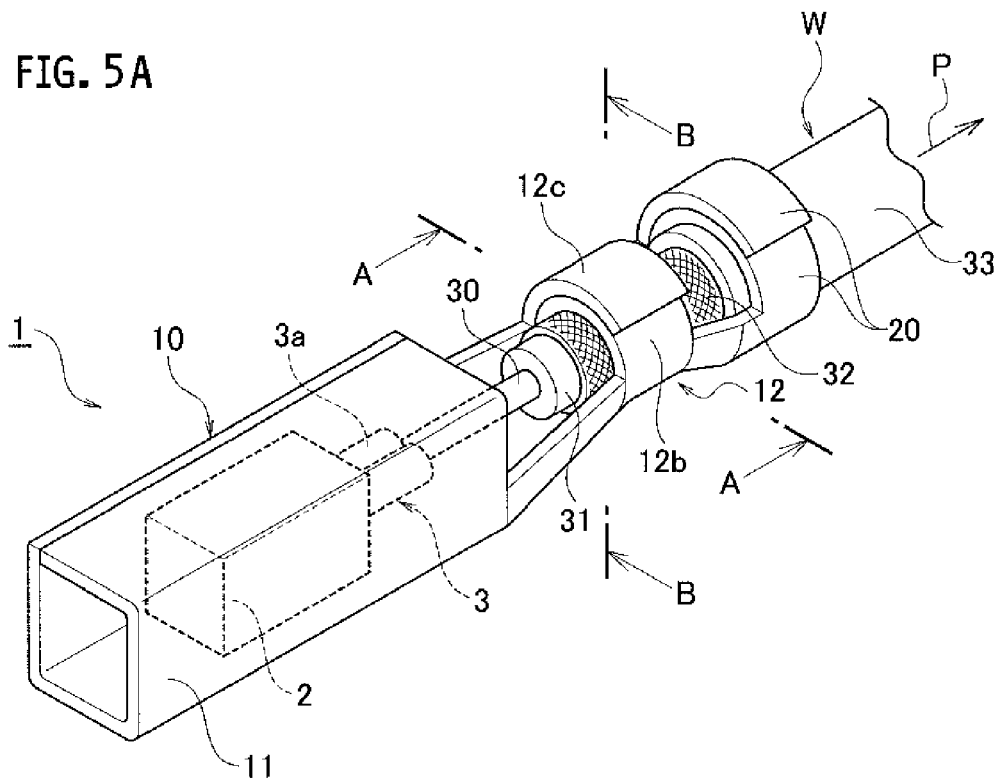
FIG. 5A is a perspective view of a shield connector according to an exemplary embodiment of the present invention.

FIGS. 5A to 7 show the exemplary embodiment of the present invention. In the present embodiment, a connection structure for a shield wire according to the present invention is applied to a shield connector 1. In FIG. 5A, the shield connector 1 includes an inner housing 2, a connection terminal 3 which the inner housing 2 accommodates, and a shield shell 10 which covers the outer circumference of the inner housing 2.

The inner housing 2 is formed of an insulator which has a predetermined permittivity. The connection terminal 3 includes a core wire fastening portion 3a and a connection portion (not shown) which is for a connection to a corresponding terminal.

The shield shell 10 is formed of a conductive material. The shield shell 10 includes a shield body 11 in a box shape, which covers the whole area of the inner housing 2 except for the front and the back thereof, a shield fastening portion 12 which extends backward from the shield body 11, and a wire fastening portion 20. The structure of the shield fastening portion 12 will be described in detail below.

A coaxial shield wire W includes a core wire 30 which is a conductor, an insulating inner cover 31 which covers the outer circumference of the core wire 30, a braided wire 32 which is a shield conductor and covers the insulating inner cover 31, and an insulating outer cover 33 which covers the outer circumference of the braided wire 32. At a terminal part of the shield wire W, the insulating outer cover 33 is removed by a predetermined length and the insulating inner cover 31 is removed by a predetermined length such that the core wire 30 is exposed and then the braided wire 32 is exposed. The exposed core wire 30 is fastened tightly by the core wire fastening portion 3a of the connection terminal 3 for a connection thereto. The exposed braided wire 32 is fastened tightly by the shield fastening portion 12 of the shield shell 10 for a connection thereto. The shield wire W is fastened tightly from the top of the insulating outer cover 33 by the wire fastening portion 20 of the shield shell 10 and firmly fixed thereto.

Figure 5B:
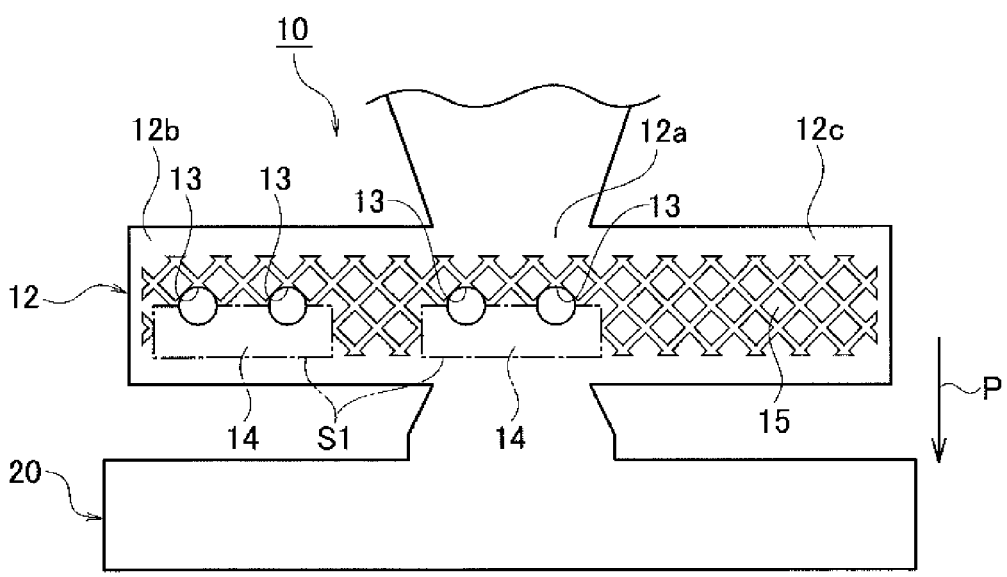
FIG. 5B is a development view of a shield fastening portion and a wire fastening portion according to the exemplary embodiment of the present invention.

Next, a detailed structure of the shield fastening portion 12 will be described. As shown in FIG. 5B, the shield fastening portion 12 includes a bottom wall 12a, and a pair of belt members 12b and 12c which protrudes from both ends of the bottom wall 12a. The shield fastening portion 12 has a plurality of holes 13 at regular intervals on a straight line along a width direction thereof. For the plurality of holes 13, two holes are formed on the bottom wall 12a and two holes are formed on the belt member 12b which is one of the pair of the belt members 12b and 12c. Each of the holes 13 is formed in a circular shape.

The shield fastening portion 12 has a conductor contact surface where a non-knurled surface 14 is formed, which is not knurled. The non-knurled surface 14 is an area around each of the holes 13 and also on the lower side of a wire pulling direction P. In FIG. 5B, for clarification, an area S1 of the non-knurled surface 14 is shown as areas surrounded by virtual lines. The conductor contact surface of the shield fastening portion 12 also has a knurled surface 15 formed thereon, which is knurled. The knurled surface 15 is an area around each of the holes 13 and also on the upper side of the wire pulling direction P, and an area outside the area around each of the holes. The non-knurled surface 14 is a flat surface. The knurled surface 15 is a shallow concave-convex surface in a lattice form.

Figure 6:
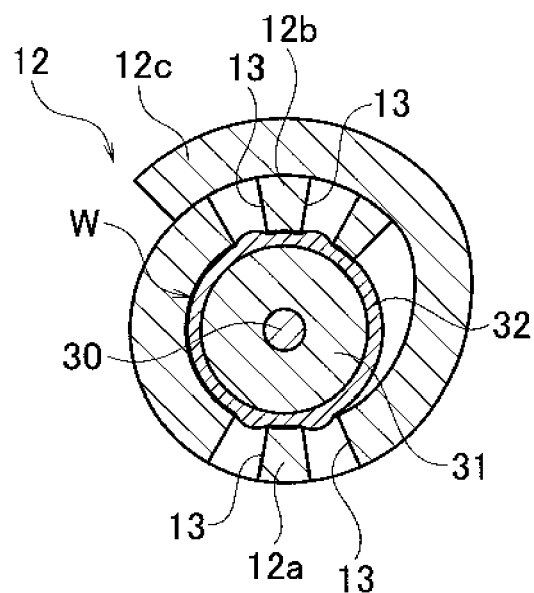
FIG. 6 is a cross-sectional view taken along a line A-A in FIG. 5A.
Figure 7:
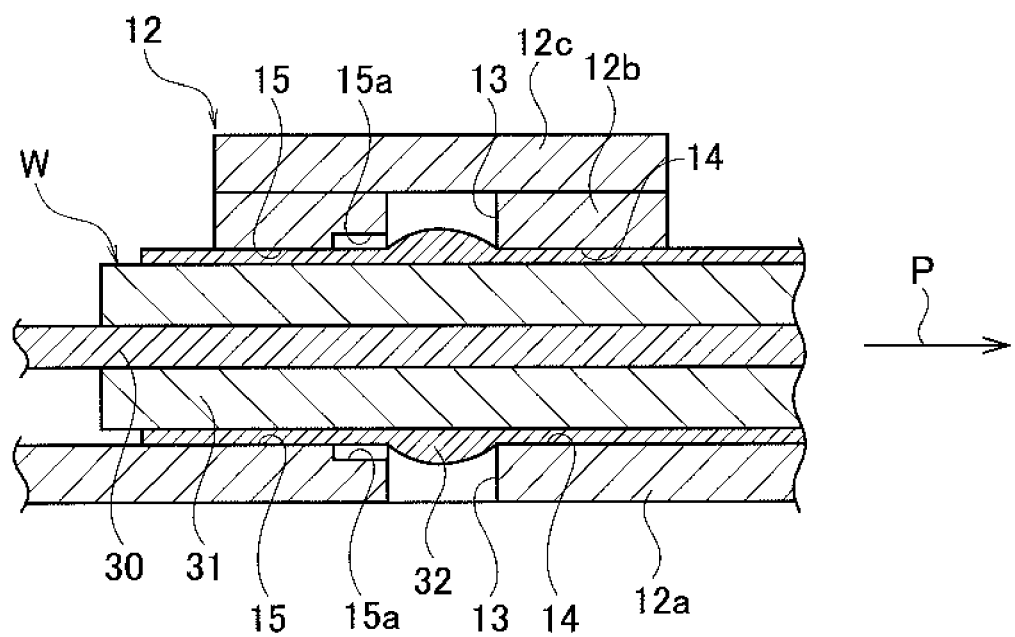
FIG. 7 is a cross-sectional view taken along a line B-B in FIG. 5A.

As shown in detail in FIGS. 6 and 7, the shield fastening portion 12 tightly fastens the braided wire 32 which is arranged on the bottom wall 12a such that the pair of belt members 12b and 12c wraps the braided wire 32. The pair of belt members 12b and 12c is folded such that the belt member 12b, where the two holes 13 are formed, becomes inside and the belt member 12c becomes outside.

Since the braided wire 32 at the shield fastening portion 12 adheres closely to the knurled surface 15 which is the concave-convex surface, the braided wire 32 does not fray. Since the braided wire 32 receives a compression force by being fastened, the braided wire 32 is pressed into each of the holes 13 of the shield fastening portion 12. On the lower side of the wire pulling direction of each of the holes 13, since convex parts 15a (shown in FIG. 7) of the knurled surface 15 are not positioned around each of the holes 13, the edge effect by holes 13 is not reduced. Therefore, even though the strong fastening force is not applied, it is possible to obtain the wire fastening force (wire pulling strength) which is at a predetermined level or more. As described above, it is possible to surely prevent the fray of the braided wire 32 and also enhance the wire fastening force at the shield fastening portion 12.

The area S1 of the non-knurled surface 14 may be in a range where the convex part 15a of the knurled surface 15 is not formed so as to face the edge of each hole 13.

The shield conductor is the braided wire 32, but may be another structure capable of obtaining the electromagnetic shielding effect.

In the present embodiment, there is shown a case where the connection structure for a shield wire is applied to the shield connector 1. It is however possible to apply to ones other than the shield connector 1. That is, it is possible to apply to all portions where the shield conductor (braided wire 32) of the shield wire W is fastened tightly by the shield fastening portion 12 for a connection thereto.

(Variation of Shield Fastening Portion)

Figure 8:
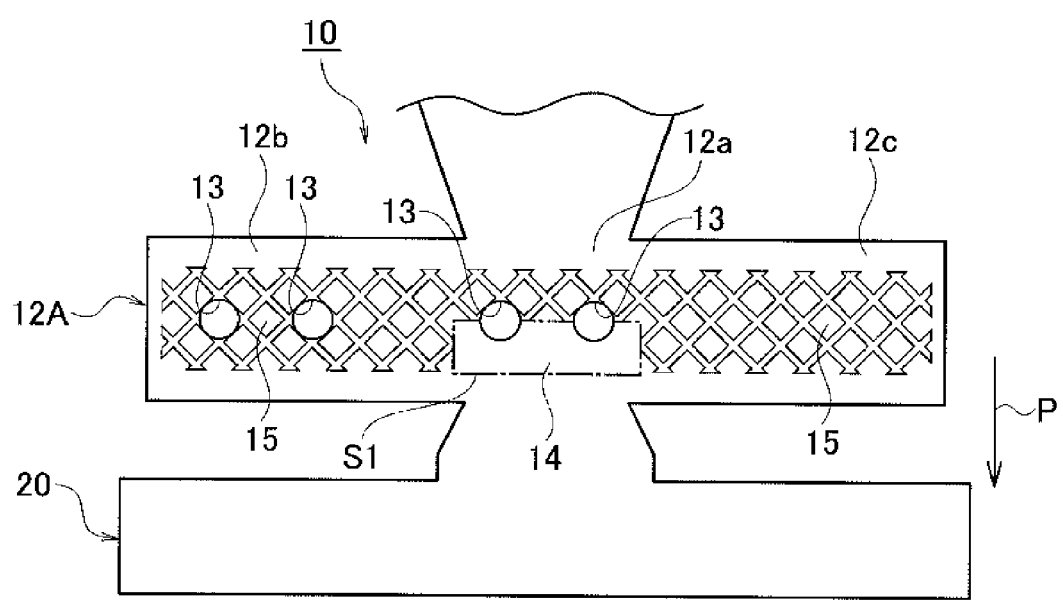
FIG. 8 is a development view of a shield fastening portion and a wire fastening portion according to a variation of the exemplary embodiment of the present invention.

FIG. 8 shows a variation of the shield fastening portion 12A. The shield fastening portion 12A according to the variation has the non-knurled surface 14 formed thereon, which is not knurled. The non-knurled surface 14 is an area around the two holes 13 of the bottom wall 12a and also on the lower side of the wire pulling direction. The shield fastening portion 12A has the knurled surface 15 formed thereon, which is knurled. The knurled surface 15 is all area around the two holes 13 of the belt member 12b.

According to the variation, it is possible to obtain the similar action and effect as the above-described embodiment.

As another variation, the shield fastening portion may have all area that surrounds each of the holes as a non-knurled surface which is not knurled, and an area outside the area that surrounds each of the holes as a knurled surface which is knurled.

What is claimed is:

1. A connection structure for a shield wire comprising:
   a shield wire that has a shield conductor; and
   a shield fastening portion that tightly fastens the shield conductor of the shield wire such that the shield fastening portion is connected to the shield wire,
   wherein the shield fastening portion is provided with a hole,
   the shield fastening portion has a wire contact surface that includes: a non-knurled surface that is not knurled, the non-knurled surface being an area around the hole and on the lower side of a wire pulling direction; and a knurled surface that is knurled, the knurled surface being an area other than the area around the hole and on the lower side of the wire pulling direction.

2. The connection structure for a shield wire according to claim 1,
   wherein around the hole, an area on the upper side of the wire pulling direction is knurled and an area on the lower side of the wire pulling direction is not knurled.

* * * * *